United States Patent [19]
Dupre

[11] Patent Number: 5,666,909
[45] Date of Patent: Sep. 16, 1997

[54] PET RESTRAINING DEVICE AND SHACKLE

[76] Inventor: A. J. Dupre, 6717 N.W. 53rd Ter., Gainesville, Fla. 32653

[21] Appl. No.: 497,348

[22] Filed: Jun. 30, 1995

[51] Int. Cl.⁶ .................................................. A01K 1/06
[52] U.S. Cl. ................................................................ 119/797
[58] Field of Search .................................. 119/786, 787, 119/788, 791, 792, 795, 771, 797, 818, 819, 831, 834; 54/71, 24, 85, 34, 61, 18.1, 69, 87

[56] References Cited

U.S. PATENT DOCUMENTS

| | | | |
|---|---|---|---|
| 255,574 | 3/1882 | Bonelli | 54/34 |
| 337,395 | 7/1886 | Erlinger et al. | |
| 356,665 | 1/1887 | Seymour | |
| 530,136 | 12/1894 | Sweetland | 54/34 |
| 889,707 | 6/1908 | Mett | 54/34 |
| 1,236,014 | 8/1917 | Sievert | |
| 1,712,198 | 5/1929 | Clapp | |
| 2,014,845 | 9/1935 | Holland | |
| 2,758,769 | 8/1956 | Nunn et al. | |
| 2,909,154 | 10/1959 | Thomas | |
| 3,310,034 | 3/1967 | Dishart | |
| 4,237,587 | 12/1980 | Hsiao et al. | |
| 4,416,037 | 11/1983 | Panthofer et al. | |
| 4,817,562 | 4/1989 | Giroux | |
| 4,970,991 | 11/1990 | Luce | |
| 5,154,660 | 10/1992 | Snyder et al. | |
| 5,167,203 | 12/1992 | Scott et al. | |

Primary Examiner—Thomas Price
Attorney, Agent, or Firm—Saliwanchik, Lloyd & Saliwanchik

[57] ABSTRACT

Described herein is a pet restraining device, for use in vehicles, the comprises a shackle and a strap having two closable hooks or the like. Preferably, the length of the strap is adjustable. The shackle comprises a central loop and two overlapping end loops, all of which define substantially one plane. This invention is used by attaching the shackle to the seat belt of an automobile. The shackle is designed so that it can be easily attached to a fastened seat belt or to a seat belt that is an integral, closed loop. One end of the strap is hooked to the shackle, and the other end of the strap is hooked to a collar or harness on the pet. Although the preferred embodiment comprises a combination of a strap and a shackle to be used as a pet restraining device, the shackle element can be used in a variety of applications.

18 Claims, 1 Drawing Sheet

PET RESTRAINING DEVICE AND SHACKLE

BACKGROUND OF THE INVENTION

The existence of a number of patents relating to animal restraining devices for use in vehicles is evidence of the recognized need for such a device that is simple in construction, convenient to use, and safe and comfortable for the animal being restrained.

For example, U.S. Pat. No. 3,310,034 shows the use of eye-bolts and additional straps to attach a special pet harness to a vehicular seat. These straps and bolts do not appear to be part of the original equipment of the automobile but must be specially installed. Likewise, U.S. Pat. No. 2,909,154 shows the use of additional straps to attach a leash-like strap to a vehicular seat. Similarly, U.S. Pat. No. 2,758,769 and U.S. Pat. No. 1,712,198 show a safety belt or harness for children that uses an additional strap that is attached to eyelets.

U.S. Pat. No. 4,970,991 shows an animal safety belt that uses a loop in the belt to attach the pet to a structural element of the vehicle. This arrangement does not facilitate easy attachment to a closed-loop or fastened vehicular safety belt, as the binding loop would have to be undone, passed around the seat belt, fed back through the buckle, and then adjusted to the desired size.

U.S. Pat. No. 5,167,203 shows a relatively clumsy, large device with a heavy frame that attaches to a seat belt that must first be unfastened. The seat belt must be unfastened so that it can be passed through the frame. This device is designed to prevent lateral movement of the pet by attaching a pet harness to two points on the large frame.

U.S. Pat. No. 4,817,562 shows a vehicular pet restraint that is designed to buckle into both ends of a vehicular seat belt system. This arrangement is undesirable as seat belt buckling systems are not uniform. U.S. Pat. No. 5,154,660 shows a pet restraining apparatus. An embodiment of this device is also designed to fit into the buckle end of a vehicular seat belt system. The fact that various buckle adapters are shown is evidence that such arrangements are inefficient and cumbersome. Two embodiments are shown that would be able to be attached to a fastened seat belt. However, these embodiments are shown to use clamping assemblies that, themselves, comprise two or more components. These embodiments appear to use either a relatively complicated and weak attachment, or an attachment that would easily fall off of the seat belt when not in an attached configuration on the restraining strap.

However, no reference is known that discloses a pet restraining device that uses a shackle that is similar to that which is presently disclosed. Similarly, no shackle is known that is similar to that which is presently disclosed.

U.S. Pat. No. 4,416,037 shows a relatively complex, releasable connector for leashes and safety lines. This connector comprises a spherical head member, a guiding channel, and a lock bolt.

U.S. Pat. No. 356,665 shows a garment supporter. However, the garment supporter is not designed to releasably attach to a belt, and the intended use is quite limited. Similarly, U.S. Pat. No. 2,014,845 discloses a lingerie strap holder. Although that holder can be releasably attached to a strap, there are several distinctions between that holder and the shackle of the subject invention. First, the intended use of the '846 holder is quite limited. In addition, that holder is designed to be sewed onto a dress. Thus, it is, in effect, attached permanently at one end. Moreover, the strap-retaining loop is an open loop. That is, when the holder is attached and is holding the strap, the strap can slip out of or be removed from the retaining loop. It is also clear that the loop of the '845 holder was not designed to withstand any substantial force on the strap, as force on the strap would have a tendency to pull the wire apart, thus allowing the strap to pass between the open end of the retaining loop.

U.S. Pat. No. 1,236,014 shows a snap hook. It is clear that the snap-hook embodiments disclosed therein comprise two loops that define substantially perpendicular planes. The overlapping loops are pressed together by the arrangement of the spring wire. That snap hook is designed to allow an object inserted in one loop to be moved into the other loop by spreading apart the opposite portions of the wire. In addition, the only embodiment that is shown to have substantially coplanar loops is clearly taught to be used as a key ring.

The devices mentioned above each have significantly different structures and functions than the invention taught herein. The devices described in the patents listed above are believed to be ineffective or substantially less effective in achieving the effects which the invention herein disclosed seeks to achieve.

It is deskable to have a device that can securely fasten a strap to a vehicular seat belt while allowing easy removal and attachment of the device from the seat belt. This device should be simple and easy to make, use, store, and carry. It is also desirable to have a simple, economic, and easy-to-use means for attaching a strap, cord, cable, or belt to another strap or the like. The subject invention provides these advantages among others.

BRIEF SUMMARY OF THE INVENTION

In one embodiment, the subject invention comprises a shackle and a strap having two closable hooks or the like. Preferably, the length of the strap is adjustable. A preferred embodiment of the subject invention is used by attaching the shackle to the seat belt of an automobile. The shackle is designed so that it can be easily attached to a fastened seat belt or to a seat belt that is an integral, closed loop. One end of the strap is hooked to the shackle, and the other end of the strap is hooked to a collar or harness on the pet.

This device may be used to prevent injury to the pet by holding the pet in place during hard braking, for example. However, the main use of the device would be to prevent the animal from interfering with the driver, or to keep the animal in place if left in the car for a short time with the windows open.

Although the preferred embodiment comprises a combination of a strap and a shackle to be used as a pet-restraining device, the shackle element can be used in a variety of applications.

DETAILED DESCRIPTION OF THE INVENTION

Figure 1:
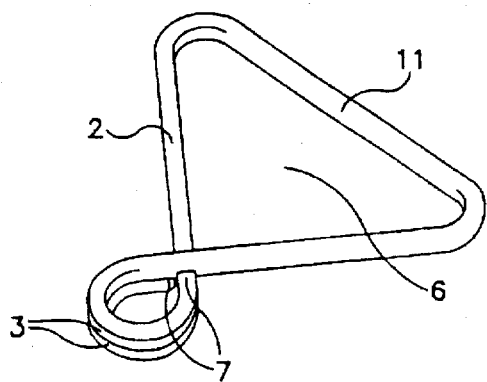
FIG. 1 is a perspective view of a preferred embodiment of the shackle.
Figure 2:
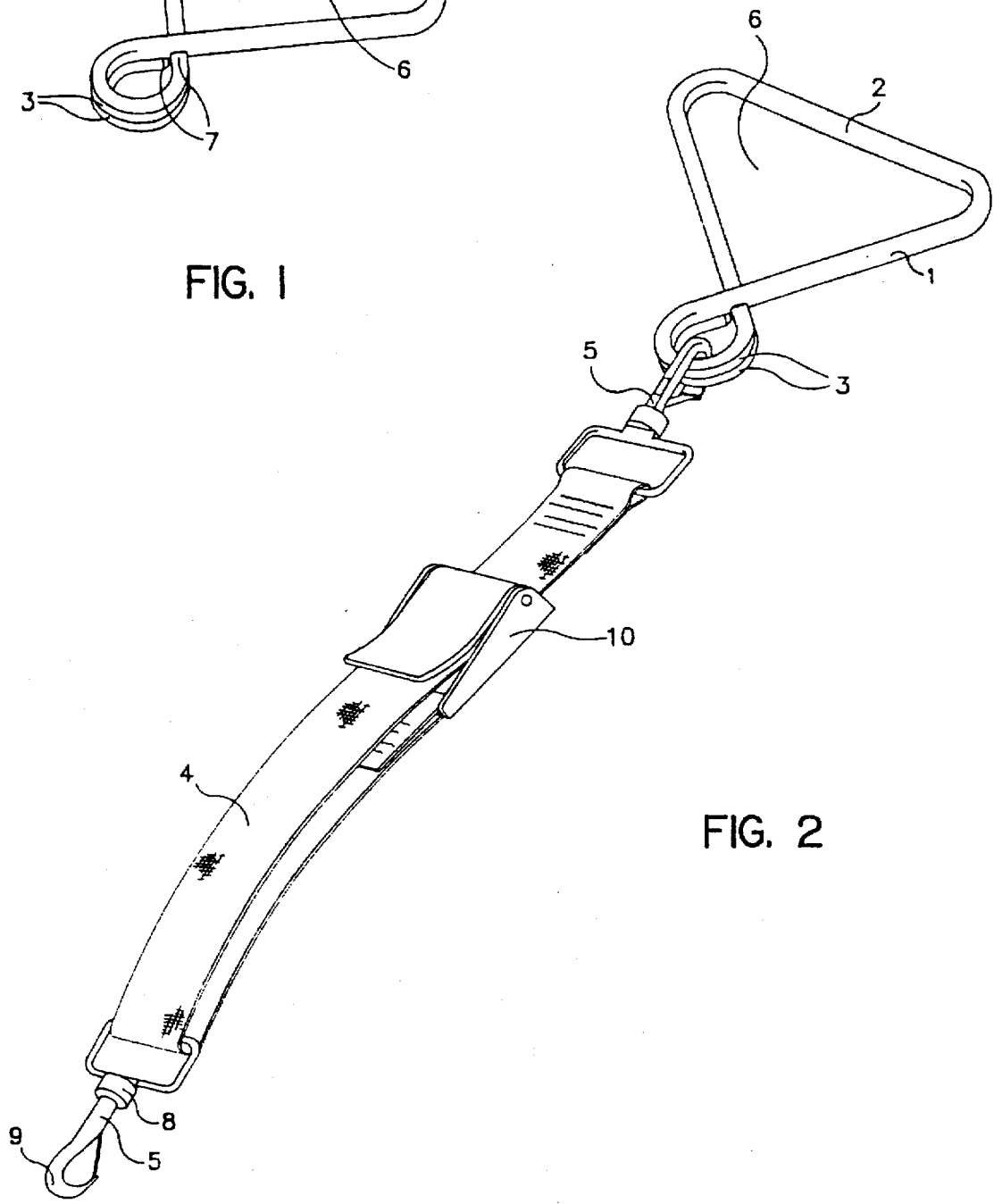
FIG. 2 is a perspective view of a preferred embodiment of the pet restraining device. The shackle is shown to be attached to the strap by a pivoting snap hook.

In a preferred embodiment, the subject invention concerns a pet restraining device which comprises a shackle and a strap having two closable hooks. The shackle is typically formed from a bent metal rod. Referring to the Figures, the shackle 1 typically comprises a substantially central loop 2 and two end loops 3 that are substantially overlapping. These three loops define substantially a single plane. The strap element comprises a strap 4 having two closable hooks 5 attached to each end of the strap. Preferably, the strap 4 has an adjustable length. In a preferred embodiment the invention is used by attaching the shackle 1 to the seat belt of an automobile and then hooking the strap 4 to the shackle 1. The other end of the strap 4 is hooked to a collar or harness on the pet.

The shackle 1 is designed so that it can be easily attached to a fastened seat belt or to a seat belt that is an integral, closed loop. The shackle 1 is attached to the seat belt by passing the seat belt between the overlapping ends 3 of the shackle 1 and into a cavity 6 defined by the central loop 2. When the seat belt is first passed through the shackle, the seat belt will be in the same plane defined by the shackle. Once the shackle 1 is attached to the seat belt, during use, the seat belt will typically be substantially perpendicular to the plane defined by the shackle. The shackle 1 can be constructed so that a gap is defined between the overlapping end loops 3 so that the belt can be passed into the cavity 6 without requiring the application of a substantial amount of external force by the user to separate the end loops 3. This gap can add to the convenience of using the subject invention.

A snap hook 5, preferably, is used to attach the strap 4 to the shackle 1. The snap hook 5 is hooked onto both end loops (rings) 3 of the shackle 1. With a snap hook 5 attached in this manner, the shackle 1 cannot be removed from, and will not slip off of, the belt; the shackle 1 is, thus, closed around the seat belt. However, once the snap hook 5 is taken off of the shackle 1, the shackle can easily be selectively removed from the belt by slipping the belt through the space between the two rings 3. However, the integral shackle 1 can remain attached to the seat belt even when the strap 4 is not hooked onto it. The shape of the shackle 1, as discussed below, can facilitate the easy storage of the shackle in this manner.

This device may be used to prevent injury to a pet by holding the pet in place during hard braking, for example. However, the main use of the device would be to prevent the animal from interfering with the driver, or, preferably, to keep the animal in place if left in the car for a short time with the windows open. During use, the shackle 1 can slide along the seat belt which allows the pet to move in the seat without being unduly restricted and uncomfortably held motionless. However, the force of the seat belt on the attached strap 4 will restrict the distance the pet can travel. In addition, a quick pull on the strap 4 would lock the seat belt and prevent further movement of the pet. Thus, the pet can be restrained from interfering with the driver or from lunging or leaping out of the open window of the car. Most preferably, the strap 4 should be attached to a harness instead of a collar in order to prevent injury to the animal from a strong jerk on the strap 4. However, the use of a harness is not essential, especially when used to restrain the animal in an open, unattended vehicle.

The shackle 1 can be made of various materials and can be made in various shapes and sizes. It is preferred that the central loop 2 of the shackle 1 is substantially triangular. This shape allows for the most advantageous attachment of the shackle 1 to an object such as a seat belt. It is also preferred that the end loops 3, or rings, are smaller and circular. This shape will facilitate the attachment of a snap hook 5 to the shackle 1 and is the most efficient to manufacture. The shackle 1 can be made of stainless steel, such as 316 stainless steel, or other material such as nickel plated steel, brass, nickel plated brass, copper, or various alloys. The shackle 1 can also be made from sturdy plastic or wood. The material can be treated in various ways, as known in the art, to enhance the strength, appearance, or other qualities of the shackle 1. The diameter and cross-sectional shape of the rod that is typically used to make the shackle 1 can also be varied. Preferably, each rod end 7 is welded to a portion of the rod so that each end loop 3 is a closed loop. These welds add to the strength of the shackle and are helpful in allowing the shackle 1 to resist distortion, especially at the end loops 3, which may have a tendency to occur as force is applied to the shackle 1. Main factors that will be considered in selecting the various characteristics of the shackle 1, and of the other elements, will include the size of the pet to be restrained, production costs, and the convenience of using and storing the shackle.

Various modifications can be made to the strap element, depending on the intended use of the subject invention. For example, a stainless steel snap hook 5 is preferably attached to each end of the strap 4. Preferably, each snap hook 5 further comprises a pivoting means 8 for allowing the hook portion 9 of the snap hook 5 to pivot relative to the strap 4. This arrangement can prevent the strap from becoming twisted and tangled. However, any reasonable means for attaching the strap 4 to the shackle 1 or to a pet collar can be used. Of course, it should be understood that a pet collar can be a harness or any other similar pet holders, as are well known in the art. The strap 4 can be made of various materials. A piece of rope is sufficient. A belt of nylon webbing is preferred. The strap 4 must be of a suitable strength to hold the pet without breaking. This will depend on the size of the pet to be attached. The snap 5 hook should be strongly attached to the strap 4. Various such techniques that are known in the art can be used to accomplish this attachment, including sewing, heat bonding, or gluing. The length of the strap 4 can be fixed or variable to allow the pet to move freely within a desired area. The length of the strap 4 can be made adjustable with a cam lock 10, an adjustable fastener or buckle, or other such means that are known in the art. Typically, the strap 4 is about 6" to 12" in length. The length of the strap 4 should be adjusted so that the pet is prevented from substantially interfering with the driver, so that the pet is prevented from lunging or leaping out of the vehicle, and so that the pet will not contact a hard surface, such as the dashboard, during a forceful experience such as hard braking.

Although the preferred embodiment comprises a combination of a strap and a shackle to be used as a pet-restraining device, the shackle element can be used in a variety of applications. The shackle 1, as described above, may be adapted for use in attaching child safety seats to seat belts. The shackle 1 may also be adapted for use on sail boats, awnings, tarps, tents, harnesses, backpacks, repelling equipment, and mountain climbing equipment. The shackle 1 can also be used with tie downs for cargo nets, as used on cargo planes, ships, trucks, and the like. Basically, the shackle 1 can be used in any application where it is desirable to make an attachment to a belt, cord, rope, or cable. The shackle 1 can also be adapted for attachment to large, rigid articles, such as a board of a crate or pallet. When the central loop 2 is triangular or rectangular, a roller can be attached on the base leg 11 of the central loop. The various uses of such embodiments will be apparent to skilled artisans.

Following is an example which illustrates procedures, including the best mode, for practicing the invention. This example should not be construed as limiting.

EXAMPLE 1

A 10" long piece of ⅛" diameter, round, stainless steel rod is bent to form two rings (loops) of approximately the same size at each end of the rod. The rod can be heated with a torch to aid in the bending. The two rings will be the end rings. Each end of the rod is then welded so that each end ring is a closed loop. The welds further strengthen the shackle. The rod is then bent to form a triangular central loop with overlapping, axially concentric end rings at the apex of the triangle. The bent rod can be heated and quenched in cold water or annealed in an oven.

One end of ¾" wide, 7" long nylon webbing is attached to a swiveling snap hook. The other end of the nylon webbing is passed through a cam lock adjustable fastener and a swiveling snap hook. This end of the nylon webbing is then attached to the cam lock. The nylon webbing is attached to the swiveling snap hook and the cam lock by sewing or heat bonding.

Although the foregoing invention has been described in some detail by way of illustration and example, it will be understood that the present invention is not limited to the particular description and specific embodiments described, but rather may comprise a combination of the above elements and variations thereof, many of which will be obvious to those skilled in the art in view of this disclosure.

It should be understood that the example and embodiments described herein are for illustrative purposes only and that various modifications or changes in light thereof will be suggested to persons skilled in the art and are to be included within the spirit and purview of this application and the scope of the appended claims.

I claim:

1. A pet restraining device comprising a shackle, wherein said shackle comprises a central loop and two substantially overlapping end loops, and wherein said central loop and said end loops define substantially a single plane; a strap; shackle attachment means for attaching said strap to said end loops of said shackle; and pet attachment means for attaching said strap to a pet collar.

2. The pet restraining device, according to claim 1, wherein said shackle attachment means is a first snap hook and said pet attachment means is a second snap hook.

3. The pet restraining device, according to claim 2, wherein said first snap hook and said second snap hook are swiveling snap hooks.

4. The pet restraining device, according to claim 1, wherein said strap has a length, further comprising an adjustment means for adjusting the length of said strap.

5. The pet restraining device, according to claim 4, wherein said adjustment means is a cam lock fastener.

6. The pet restraining device, according to claim 1, wherein said central loop is substantially triangular.

7. The pet restraining device, according to claim 1, wherein said end loops are substantially circular.

8. The pet restraining device, according to claim 1, wherein said end loops are closed loops.

9. A pet restraining device comprising a shackle, wherein said shackle comprises a central loop that is substantially triangular and two substantially overlapping, substantially circular end loops, and wherein said central loop and said end loops define substantially a single plane; a strap having a first strap end and a second strap end; a first snap hook attached to said first strap end; and a second snap hook attached to said second strap end; wherein said first snap hook is selectively attached to said end loops of said shackle.

10. The pet restraining device according to claim 9 wherein said snap hooks are swiveling snap hooks.

11. The pet restraining device according to claim 9 wherein said device further comprises a cam lock fastener for adjusting the length of said strap.

12. The pet restraining device according to claim 9 wherein said shackle is adapted to fit onto a car seat belt.

13. The pet restraining device according to claim 12 wherein said triangular central loop of said shackle has a base that is about as long as the width of a car seat belt.

14. A shackle comprising a central loop and two substantially overlapping end loops, wherein said central loop and said end loops define substantially a single plane.

15. The shackle, according to claim 14, wherein said end loops are closed loops.

16. The shackle, according to claim 14, wherein said central loop is substantially triangular and said end loops are substantially circular.

17. The shackle according to claim 16 wherein said triangular central loop of said shackle has a base that is about as long as the width of a car seat belt.

18. The shackle according to claim 14 wherein said shackle is adapted to fit onto a car seat belt.

* * * * *

UNITED STATES PATENT AND TRADEMARK OFFICE
CERTIFICATE OF CORRECTION

PATENT NO. : 5,666,909
DATED : September 16, 1997
INVENTOR(S) : A. J. Dupre

It is certified that error appears in the above-indentified patent and that said Letters Patent is hereby corrected as shown below:

Item [57],
Cover Page, Abstract, line 2: "the comprises" should read --that comprises--.
Column 2, line 24: "It is deskable to" should read --It is desirable to--.

Signed and Sealed this

Eighteenth Day of November 1997

Attest:

BRUCE LEHMAN

Attesting Officer   Commissioner of Patents and Trademarks